United States Patent
Klimczak et al.

(10) Patent No.: US 12,208,568 B2
(45) Date of Patent: Jan. 28, 2025

(54) APPARATUS, SYSTEM AND METHOD FOR KINEMATIC-BASED HEATING OF AN ADDITIVE MANUFACTURING PRINT FILAMENT

(71) Applicant: JABIL INC., St. Petersburg, FL (US)

(72) Inventors: Scott Klimczak, St. Petersburg, FL (US); Luke Rodgers, St. Petersburg, FL (US); Darin Burgess, St. Petersburg, FL (US)

(73) Assignee: JABIL INC.

( * ) Notice: Subject to any disclaimer, the term of this patent is extended or adjusted under 35 U.S.C. 154(b) by 658 days.

(21) Appl. No.: 17/417,039

(22) PCT Filed: Dec. 17, 2019

(86) PCT No.: PCT/US2019/066779
§ 371 (c)(1),
(2) Date: Jun. 21, 2021

(87) PCT Pub. No.: WO2020/131830
PCT Pub. Date: Jun. 25, 2020

(65) Prior Publication Data
US 2022/0072766 A1 Mar. 10, 2022

Related U.S. Application Data

(60) Provisional application No. 62/782,185, filed on Dec. 19, 2018.

(51) Int. Cl.
*B29C 64/295* (2017.01)
*B29C 64/124* (2017.01)
(Continued)

(52) U.S. Cl.
CPC .......... *B29C 64/124* (2017.08); *B29C 64/209* (2017.08); *B29C 64/236* (2017.08);
(Continued)

(58) Field of Classification Search
USPC .......................................................... 700/98
See application file for complete search history.

(56) References Cited

U.S. PATENT DOCUMENTS 9,919,430 B1 3/2018 Bosboom
10,254,499 B1 * 4/2019 Cohen ................... B29C 64/321
(Continued)

FOREIGN PATENT DOCUMENTS

CN 103331840 10/2013
CN 105666876 6/2016
(Continued)

OTHER PUBLICATIONS

International Search Report, dated Jun. 25, 2020 for PCT/US2019/066779.
(Continued)

*Primary Examiner* — Emilio J Saavedra
(74) *Attorney, Agent, or Firm* — Riverside Law LLP (57) ABSTRACT

An additive manufacturing apparatus, system, and method for kinematic-based heating of a print filament. The apparatus, system and method may include: a print nozzle suitable to deliver at least partially liquefied print material to form a print build responsive to motion control of the print nozzle in at least two axes by a kinematic controller; at least one heater about the print nozzle suitable to effectuate the at least partial liquefication of the at least partially liquefied print material; and a correlative interface between the kinematic controller and the at least one heater, wherein the correlative interface monitors upcoming ones of the motion control so as to anticipatorily actuate the at least one heater according to the upcoming ones of the motion control.

20 Claims, 6 Drawing Sheets

(51) Int. Cl.
   *B29C 64/209*   (2017.01)
   *B29C 64/236*   (2017.01)
   *B29C 64/393*   (2017.01)
   *B33Y 10/00*    (2015.01)
   *B33Y 30/00*    (2015.01)
   *B33Y 50/02*    (2015.01)
   *B29C 64/118*       (2017.01)
   *B33Y 50/00*        (2015.01)

(52) U.S. Cl.
   CPC .......... *B29C 64/295* (2017.08); *B29C 64/393* (2017.08); *B33Y 10/00* (2014.12); *B33Y 30/00* (2014.12); *B33Y 50/02* (2014.12); *B29C 64/118* (2017.08); *B33Y 50/00* (2014.12)

(56) References Cited

U.S. PATENT DOCUMENTS

| | | | |
|---|---|---|---|
| 10,419,635 | B1 * | 9/2019 | Qian .................... H04N 1/0005 |
| 10,562,227 | B2 | 2/2020 | Go |
| 10,967,575 | B2 | 4/2021 | Grünberger |
| 11,400,641 | B2 | 8/2022 | Neboian |
| 11,623,402 | B2 | 4/2023 | Paternoster |
| 2005/0129941 | A1 | 6/2005 | Comb et al. |
| 2014/0232035 | A1 | 8/2014 | Bheda |
| 2014/0291886 | A1 | 10/2014 | Mark |
| 2014/0328963 | A1 | 11/2014 | Mark |
| 2015/0183164 | A1 * | 7/2015 | Duty .................... B29C 64/118 425/3 |
| 2015/0314531 | A1 | 11/2015 | Mark et al. |
| 2016/0271876 | A1 * | 9/2016 | Lower .................... B33Y 10/00 |
| 2017/0151704 | A1 * | 6/2017 | Go ........................ B29C 48/266 |
| 2017/0157826 | A1 | 6/2017 | Hishiki |
| 2017/0173879 | A1 | 6/2017 | Myerberg et al. |
| 2017/0334137 | A1 | 11/2017 | Nystrom |
| 2017/0348911 | A1 * | 12/2017 | Bruggeman ........ B29C 35/0805 |
| 2019/0381566 | A1 | 12/2019 | De Chirico |
| 2021/0347118 | A1 * | 11/2021 | Susnjara ................ B22F 10/18 |

FOREIGN PATENT DOCUMENTS

| | | | |
|---|---|---|---|
| CN | 107116220 | | 9/2017 |
| KR | 1020140020488 | A * | 8/2015 |
| WO | 2016049640 | | 3/2016 |
| WO | 2017189904 | | 11/2017 |
| WO | 2018026909 | | 2/2018 |
| WO | 2018038750 | | 3/2018 |
| WO | 2018039261 | | 3/2018 |
| WO | 2018093390 | | 5/2018 |
| WO | 2018191266 | | 10/2018 |
| WO | 2018194623 | | 10/2018 |
| WO | 2018219698 | | 12/2018 |

OTHER PUBLICATIONS

Written Opinion of the International Searching Authority, dated Jun. 25, 2020 for PCT/US2019/066779.

* cited by examiner

Non-Coordinated Motion

FIG.4A

Coordinated Motion

APPARATUS, SYSTEM AND METHOD FOR KINEMATIC-BASED HEATING OF AN ADDITIVE MANUFACTURING PRINT FILAMENT

CROSS-REFERENCE TO RELATED APPLICATIONS

The present application claims benefit to International Application PCT/US2019/066779, filed Dec. 17, 2019, entitled: "Apparatus, System and Method for Kinematic-Based Heating of an Additive Manufacturing Print Filament," which claims priority to U.S. Provisional Application No. 62/782,185, filed Dec. 19, 2018, entitled: "Apparatus, System and Method for Kinematic-Based Heating of an Additive Manufacturing Print Filament," the entirety of which is incorporated herein by reference as if set forth in its entirety.

BACKGROUND

Field of the Disclosure

The present disclosure relates to additive manufacturing, and, more specifically, to an apparatus, system and method for kinematic-based heating of an additive manufacturing print filament.

Description of the Background

Additive manufacturing, including three dimensional printing, has constituted a very significant advance in the development of not only printing technologies, but also of product research and development capabilities, prototyping capabilities, and experimental capabilities, by way of example. Of available additive manufacturing (collectively "3D printing") technologies, fused deposition of material ("FDM") printing is one of the most significant types of 3D printing that has been developed.

BUM is an additive manufacturing technology that allows for the creation of 3D elements on a layer-by-layer basis, starting with the base, or bottom, layer of a printed element and printing to the top, or last, layer via the use of, for example, heating and extruding thermoplastic filaments into the successive layers. Simplistically stated, an FDM system includes a print head which feeds the print material filament through a heated nozzle to print, an X-Y planar control for moving the print head in the X-Y plane, and a print platform upon which the base is printed and which moves in the Z-axis as successive layers are printed.

More particularly, the FDM printer nozzle heats the thermoplastic print filament received to a semi-liquid state, and deposits the semi-liquid thermoplastic in variably sized beads along the X-Y planar extrusion path plan provided for the building of each successive layer of the element. The printed bead/trace size may vary based on the part, or aspect of the part, then-being printed. Further, if structural support for an aspect of a part is needed, the trace printed by the FDM printer may include removable material to act as a sort of scaffolding to support the aspect of the part for which support is needed. Accordingly, FDM may be used to build simple or complex geometries for experimental or functional parts, such as for use in prototyping, low volume production, manufacturing aids, and the like.

However, the use of FDM in broader applications, such as medium to high volume production, is severely limited due to a number of factors affecting FDM, and in particular affecting the printing speed, quality, and efficiency for the FDM process. As referenced, in FDM printing it is typical that a thermoplastic is extruded, and is heated and pushed outwardly from a heating nozzle, under the control of the X-Y and/or Z driver of a print head, onto either a print plate/platform or a previous layer of the part being produced. More specifically, the nozzle is moved about by the robotic X-Y planar adjustment of the print head in accordance with a pre-entered geometry, such as may be entered into a processor as a print plan to control the robotic movements to form the part desired.

As referenced, the "hot end" of the 3D printer typically has at least one heating element at the nozzle to melt the filament. The control of the heater is often a dedicated proportional-integral-derivative controller (PID controller). A PID is a control loop feedback mechanism widely used in industrial control systems the employ continuously modulated control. A PID controller continuously calculates an error value as the difference between a desired setpoint (SP) and a measured process variable (PV), and applies a correction to the control function to address the error value based on proportional, integral, and derivative terms (denoted P, I, and D respectively).

More particularly, the nozzle temperature is often set to the melting temperature (Tm) of the filament. The PID loop correspondingly increases or decreases the energy to the heating element based on the measured variation in temperature from the Tm at the nozzle.

However, the heater and the PID controller must perform the aforementioned temperature control for a wide variety of filaments, and filament accelerations and velocities. Moreover, the requisite control may vary during the print run in accordance with the print plan. Current control methods often fail to meet this criteria, as the temperature control is difficult to adjust and/or maintain in real time, such as due to the temperature gradient of the print nozzle, etc. As such, known methods often consistently undershoot and overshoot the temperature required for aspects of the print.

For example, if the control for the heater is defined by a single set point, the response time of the controls and the heater must necessarily address the needed changes in the energy required to melt the filament to meet the print plan. But if the system, and particularly the heater, cannot keep up with the changing control requirements, the nozzle may get cold, or may over heat the material, which may adversely affect the printing quality, such as by enabling clogging of the nozzle.

SUMMARY

An additive manufacturing apparatus, system, and method are disclosed. The apparatus, system and method may include: a print nozzle suitable to deliver at least partially liquefied print material to form a print build responsive to motion control of the print nozzle in at least two axes by a kinematic controller; at least one heater about the print nozzle suitable to effectuate the at least partial liquefication of the at least partially liquefied print material; and a correlative interface between the kinematic controller and the at least one heater, wherein the correlative interface monitors upcoming ones of the motion control so as to anticipatorily actuate the at least one heater according to the upcoming ones of the motion control.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The embodiments include a controller "look ahead" to the kinematics, i.e., the movement of the print nozzle in the X-Y and/or Z axes, of the print plan to provide for anticipatory temperature adjustment and control; and, more particularly, integration of the nozzle heater control into the motion kinematics and control of an additive manufacturing system. In the known art, a typical thermal control scheme for an additive manufacturing print has a temperature set at the start of the print, based, in part, on the print feed material. A software PID loop is then used to maintain the temperature due to changing conditions, such as a change in the temperature as may reflect a change in the feed rate of the print material. This known methodology is disadvantageous for the reasons discussed above.

Figure 1:
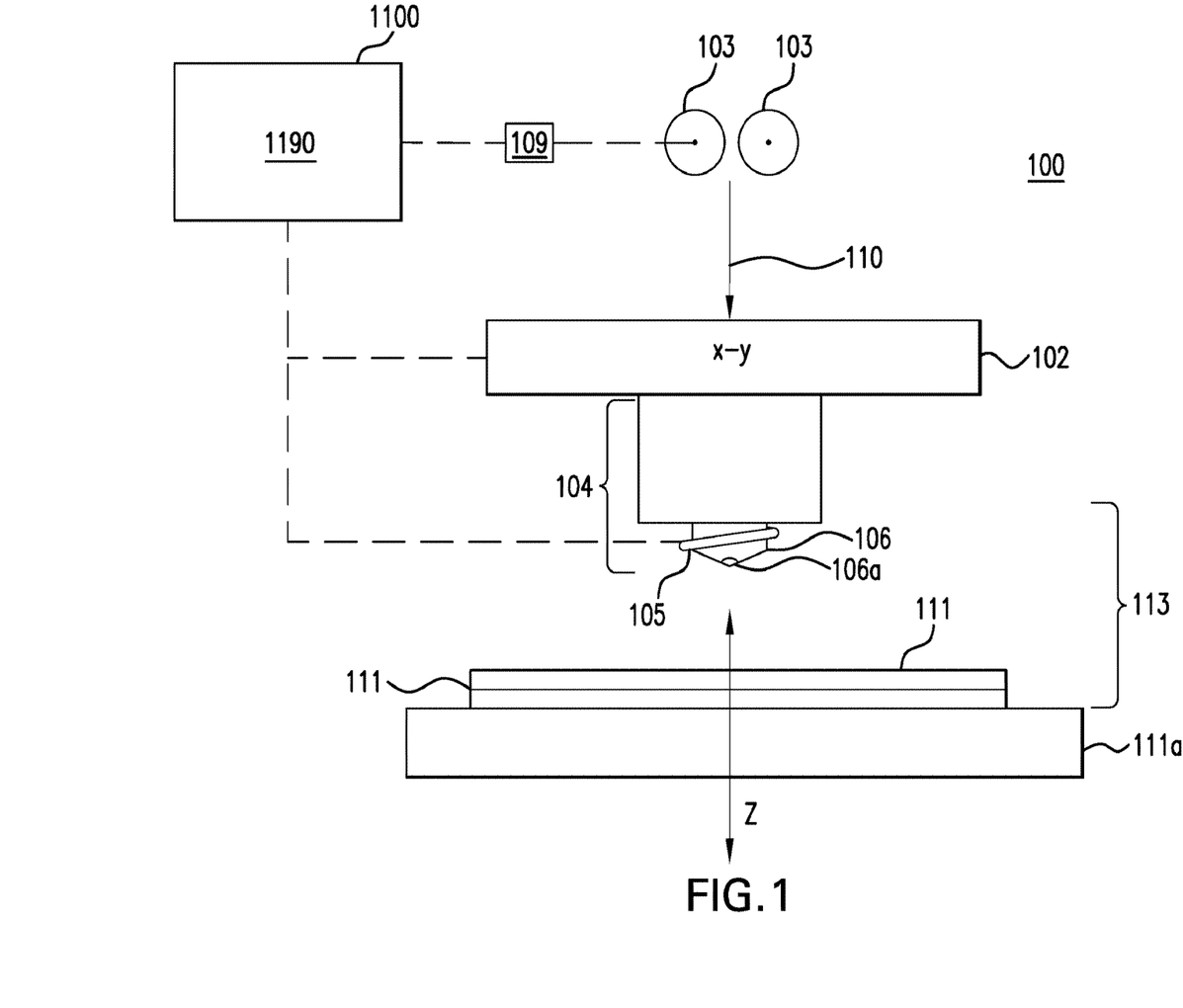
FIG. 1 is an illustration of an additive manufacturing printer.

FIG. 1 is a block diagram illustrating an exemplary filament-based printer 100. In the illustration, the printer includes an X-Y axis driver 102 suitable to move the print head 104, and thus the print nozzle 106 on the print head 104, in a two dimensional plane, i.e., along the X and Y axes, responsive to the print plan 1190. Further included in the printer 100 for additive manufacturing are the aforementioned print head 104, including print nozzle 106.

As is evident from FIG. 1, printing may occur upon the flow of heated print material outwardly from the nozzle 106 along a Z axis with respect to the X-Y planar movement of the X-Y driver 102. Thereby, layers of printed material 110 may be provided from the nozzle 106 onto the print build plate 111a/print build 111 within print environment 113 along a path dictated by the X-Y driver 102.

More particularly, filament-based 3D printers include an extruding print head 104 that uses the hobs 103 to move the filament 110 into the heated nozzle 106, i.e., past heater 105 about nozzle 106, at a feed rate tied to the controller 1100 executing the print plan algorithm 1190 via the X-Y-Z axis driver 102. A motor 109 is generally used to drive a driven one of the hobs 103 against an undriven one of the hobs 103. This extrusion and X-Y-Z movements are made responsive to the print plan 1190 executed by controller 1100, and are herein included in the additive manufacturing kinematics.

Figure 2:
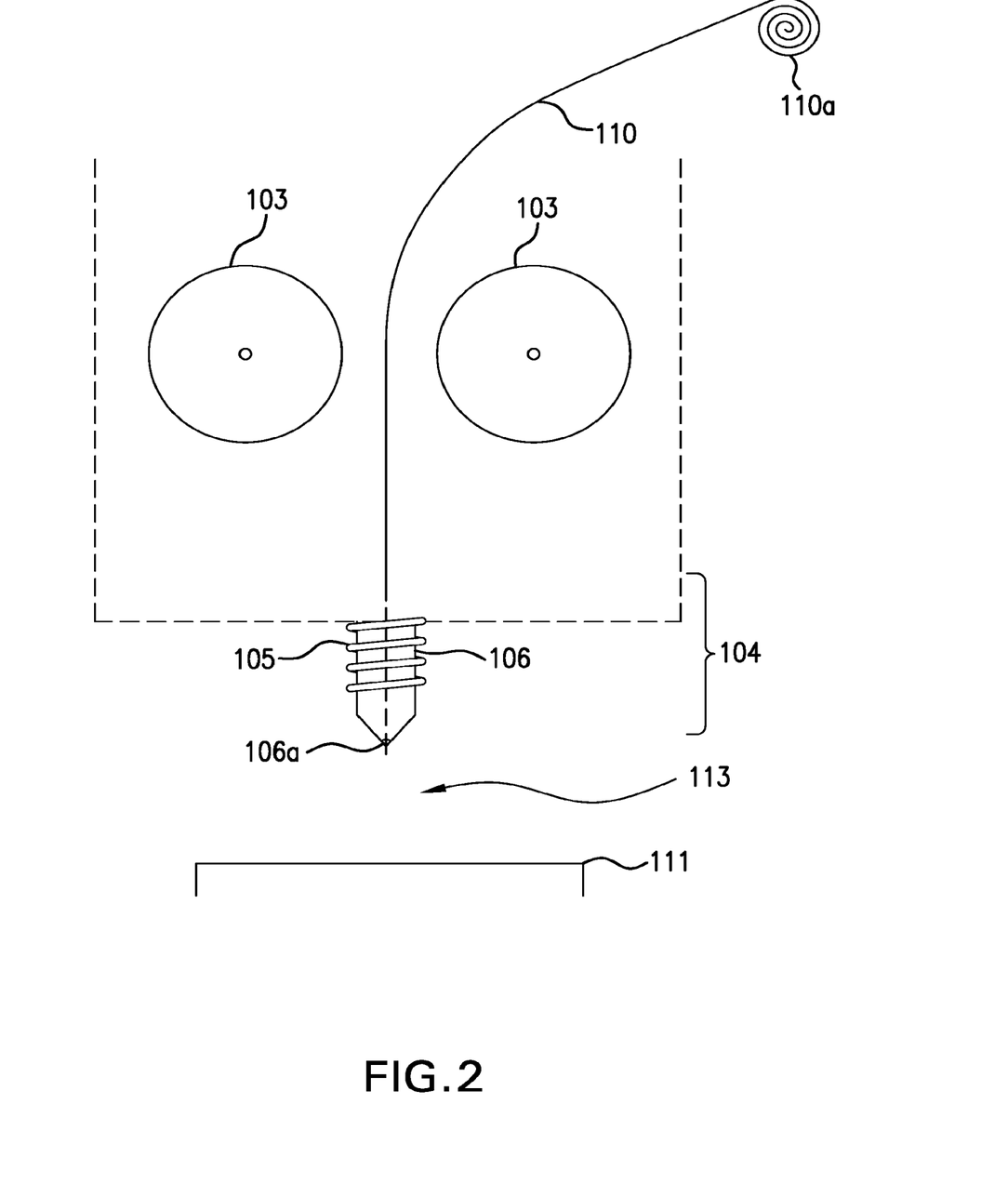
FIG. 2 is an illustration of an exemplary additive manufacturing system.

FIG. 2 illustrates with greater particularity a print head 104 having nozzle 106 for an exemplary additive manufacturing device, such as a 3-D printer, such as a FDM printer. As illustrated, the print material 110 is extruded via hobs 103 of the head 104 from a spool of print material 110a into and through the heated nozzle 106, and thus past heater 105, responsively to print plan 1190. More particularly, as the nozzle 106 heats the print material 110, the print material is at least partially liquefied for output from an end port 106a of the nozzle at a point along the nozzle distal from the print head 104 onto the print build 111 in print area 113. Thereby, the extruded material is "printed" outwardly from the port 106a via the Z axis along a X-Y planar path determined by the X-Y driver (see FIG. 1) connectively associated with the print head 104.

Figure 3:
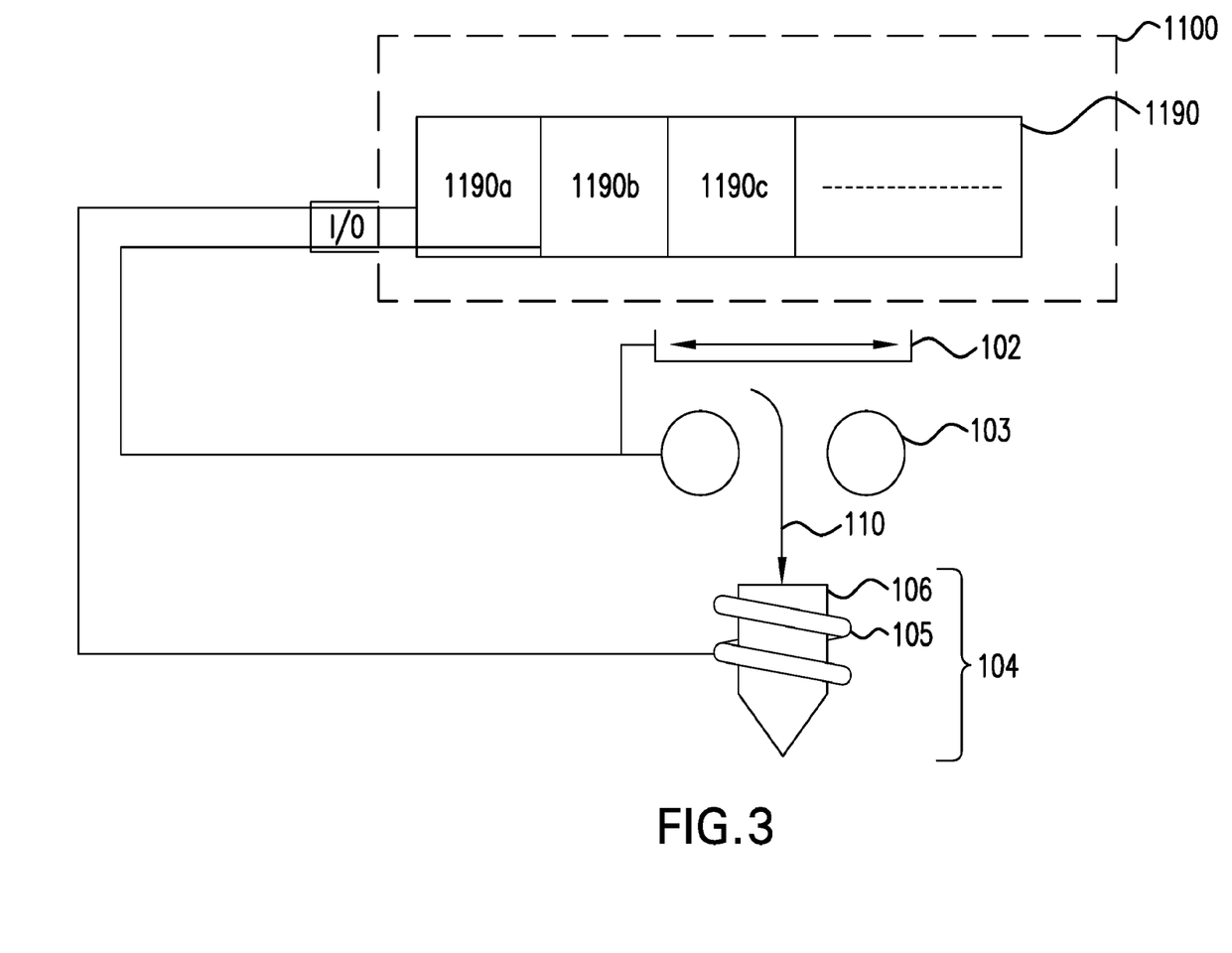
FIG. 3 illustrates a kinematic nozzle heater system.

As discussed above, the motion and feed rate of the 3D printer is the result of print plan 1190. Accordingly, and as illustrated in FIG. 3, the acc/deceleration and velocity for extrusion via hobs 103 of the filament 110, among many other factors, are known according to the print plan/control algorithm 1190. Based on at least this information, aspects of controller 1100 may drive thermal commands 1190a to increase or decrease heating by the heater 105 prior to the physical demand on the heater in accordance with the kinematics of the print plan 1190. More specifically, using a known hysteresis for any heater and nozzle 1190b as included in the control algorithm 1190, the embodiments may "look ahead" in the print plan 1190 and start driving the heater 1190a at an appropriate time and degree to address any lag in the responsiveness and based on the thermal profile for a given hot end 104.

The run time code of the control algorithm 1190 that commands the kinematics 1190b imparted to the filament 110 thus also includes thermal commands 1190a for any corresponding change in the temperature for a specific movement. For instance, a "next command" to the extruder 103 to double the feed rate may also lead to a command for a temperature change 1190a correlated to that feed rate 1190b, to thereby provide the required energy to efficiently melt the filament as needed to honor the print plan 1190.

The foregoing correlation 1190c may be accomplished via any of various methodologies. For example, rather than running commands through a standard communication interface, the embodiments may connect directly to manipulator/hardware motion kinematics. Thereby, a new movement command 1190b to the kinematics hardware may be directly received for thermal commands 1190a as it is preliminarily received by the kinematics; a defined relationship between the extruder motor motion and the heater control may be relational available in controller 1100 such that this relationship can be subject to a "look up" for a given heater/nozzle 104; and a heating command(s) 1190a may be issued in combination with execution of the motion command(s) 1190b.

By including the heater control in the motion kinematics, the intimacy of the link between the X-Y/extruder motion and the heater is greatly enhanced in the disclosed embodiments. As such, the motion of all elements of the disclosed print system may be coordinated with real time changes to the heater, which heater changes may be particularly and anticipatorily executed based on the actual kinematics of the X-Y/extruder motion according to the print plan 1190.

By way of example, if an X-Y move is commanded that is required to have a precise coordination motion, in which the path must be very tightly controlled, and there is extra drag present in at least one of the axes based on the kinematics hardware, the kinematic control senses the drag and consequently exerts more power to maintain the required path precision. The increased motion/extrusion power is correlated to a temperature increase by the print plan 1190 in the disclosed embodiments, and the heater is actuated at a time sufficient to allow the heater to reach the requisite temperature at the precise moment needed, based on the power increase exerted on the kinematics system.

Figure 4A:
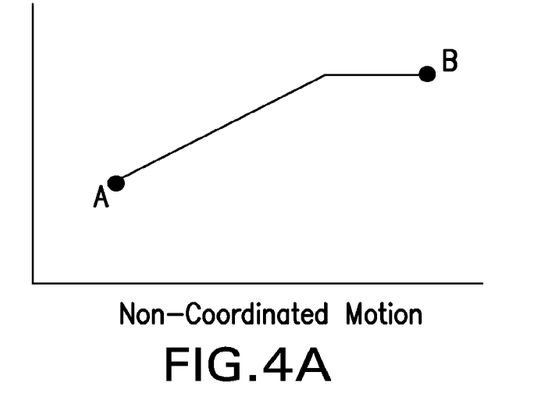
FIGS. 4A and B illustrate graphical performance of a kinematics system.
Figure 4B:
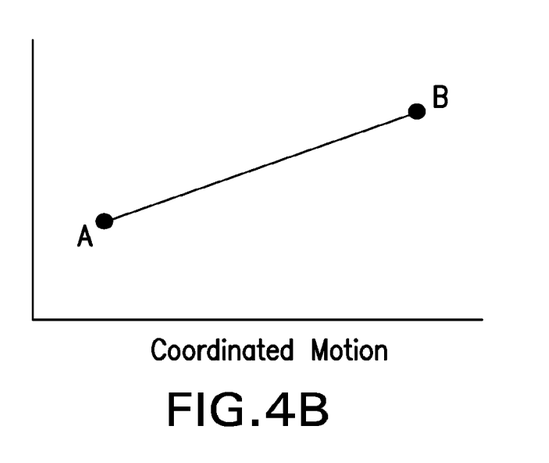

FIG. 4 graphically depict motion of an X-Y gantry system. The motion illustrated may be commanded in two modes, namely non-coordinated and coordinated motion, as discussed further herein below.

In the non-coordinated motion, the X-Y axes motors are simply moved as fast as possible to their defined positions, without coordination between the motors. In such a case, the non-coordinated motion graph of FIG. 4A illustrates that the shorter movement reaches position ahead of the longer movement, which thus creates a flat leg at the end of the motion, during which only one motor is moving.

The illustration of coordinated motion shows that the motors are driven in coordination relative to each other, thereby graphically creating a straight line of movement. More particularly, in the coordinated motion system, if one of the motors slows down, such as due to higher friction or other unexpected loading, then the other motor also slows down to maintain the "straight line motion" graphically depicted in FIG. 4B.

Similarly, the embodiments may algorithmically treat the heating element in a manner akin to the axes of motion in a coordinated system, such as is shown in FIG. 4B. Accordingly, the heater may be controlled in a coordinated fashion with the other axis(es) of motion.

The embodiments may thus be particularly desirable for low mass hot ends, in which a change in the expected filament rate generates a substantial change in the energy demanded by the nozzle to quickly reach and maintain the optimum operating temperature. Nevertheless, any change or planned change in the extruder velocity or in the X-Y motion for any type of hot end may be subjected to the embodiments.

Moreover, the disclosed heater correlation and control algorithm(s) 1190a, 1190c, in addition to providing highly expedited heating adjustment based on the kinematics 1190b of the 3D printer, also appreciably enhances the speed at which information is shared and coordinated within the kinematics control 1190b due, in part, to the intimate connection and correlation 1190c between the heater control algorithm 1190a and the kinematic control code 1190b. This allows a substantially smaller hysteresis than in the known art between the command of a change in the heater 105 based on the kinematics 1190b, and the time when the heater 105 responds to the thermal command 1190a. In short, the heater commands may thus respond at the same rate as the motors in the kinematic control loop in the embodiments.

Figure 5:
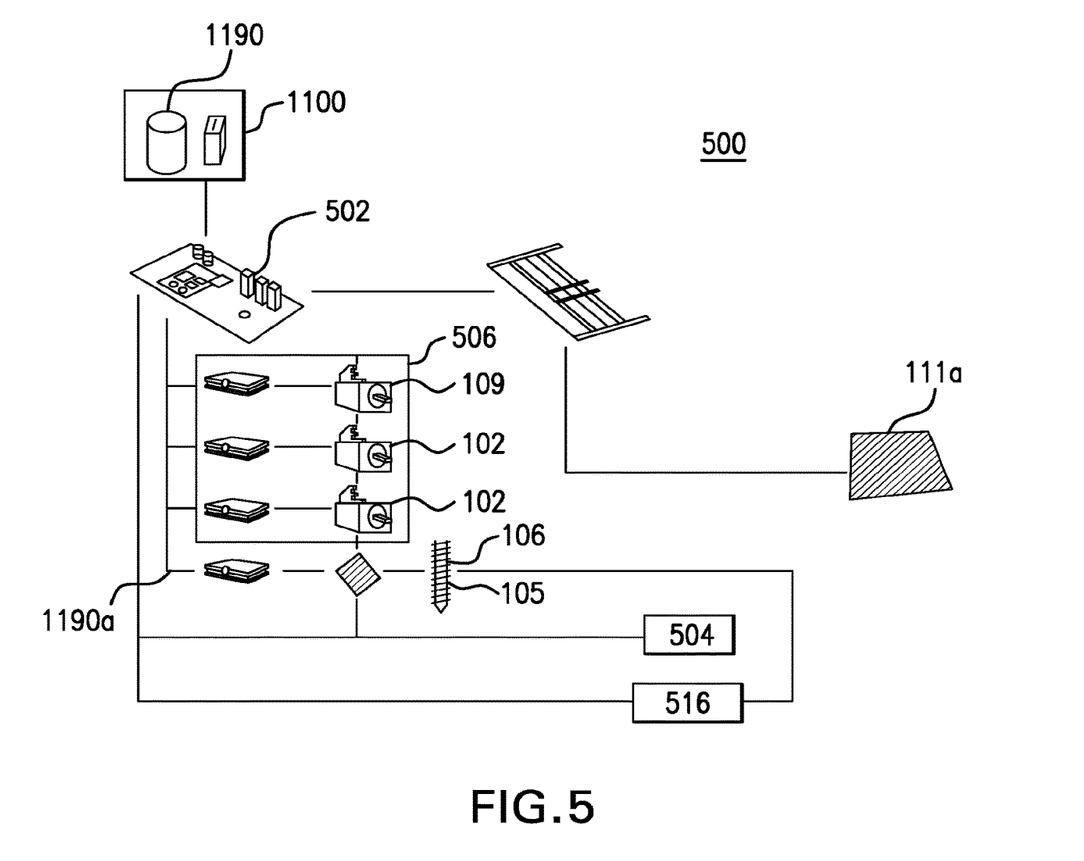
FIG. 5 illustrates a kinematic nozzle heater system.

FIG. 5 illustrates an exemplary heater feedback system 500. For the kinematic control system 502, the feedback to the control algorithm 1190 may be positional information such as may delivered by a sensor 504 associated with the kinematics hardware 506, such as an encoder that tracks motor actuation, and/or may be kinematic information provided directly from control algorithm 1190. To achieve the kinematic-centric heating control 1190a discussed throughout for the heater hardware 105, the feedback 516 from the heater hardware 105 may be converted into a signal that emulates the kinematics positional sensor 504, such as the aforementioned encoder, to the control algorithm 1190.

The heater hardware 105 may then be driven by output commands 1190a, such as from the I/O of the controller 1100, and such as may be delivered via one or more control signal amplifiers. The driver signal(s) 1190a from the controller 1100 may thus be the same or similar to that used to drive the kinematics 506, and thus the heater control 1190a may present to controller 1100 simply as an additional axis within the control algorithm 1190.

In short and in accordance with the embodiments, the heater may be controlled by the kinematic control; by the kinematic control, but on its own kinematic algorithm and driver aspects; or by a dedicated heater controller communicative with the kinematic commands. As such, there may or may not be a direct connection between the heater kinematics and the X-Y-Z kinematics.

Figure 6:
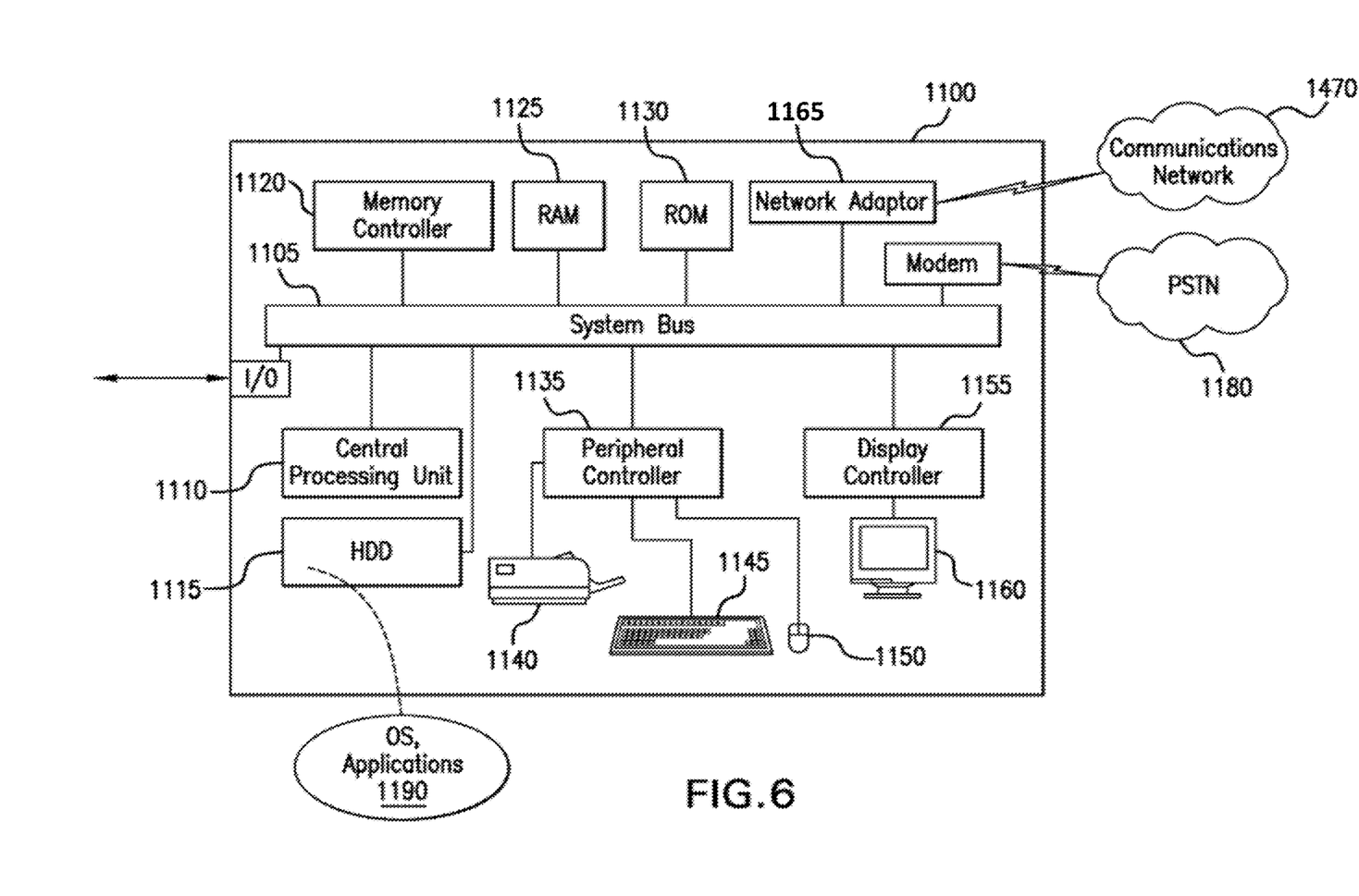
FIG. 6 illustrates an exemplary computing system

FIG. 6 depicts an exemplary computing system 1100 for use as the controller 1100 in association with the herein described systems and methods. Computing system 1100 is capable of executing software, such as an operating system (OS) and/or one or more computing applications/algorithms 1190, such as applications/algorithms applying the print plan and control algorithms discussed herein.

The operation of exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1470 or some other data communications means.

In operation, CPU 1110 fetches, decodes, and executes instructions from a computer readable storage medium, such as HDD 1115. Such instructions may be included in software such as an operating system (OS), executable programs, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 135, which is responsible for communicating instructions from CPU 1110 to, and/or receiving data from, peripherals, such as peripherals 1140, 1145, and 1150, which may include printers, keyboards, and/or the sensors, encoders, and the like discussed herein throughout. An example of a peripheral bus is the Peripheral Component Interconnect (PCI) bus.

Display 1160, which is controlled by display controller 1155, may be used to display visual output and/or presentation generated by or at the request of computing system 1100, responsive to operation of the aforementioned computing program. Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1470, which may include or provide access to the Internet, an intranet, an extranet, or the like. Communications network 1470 may provide user access for computing system 1100 with means of communicating and transferring software and information electronically. Additionally, communications network 1470 may provide for distributed processing, which involves several computers and the sharing of workloads or cooperative efforts in performing a task. It is appreciated that the network connections shown are exemplary and other means of establishing communications links between computing system 1100 and remote users may be used. The computing system 1100 may also contain a modem which may be used to couple computing system 1100 to PSTN 1180.

Network adaptor 1165 may communicate to and from network 1470 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An additive manufacturing system, comprising:
a print nozzle suitable to deliver at least partially liquefied print material to form a print build responsive to motion control of the print nozzle in at least two axes by a kinematic controller;
at least one heater about the print nozzle suitable to effectuate the at least partial liquefication of the at least partially liquefied print material; and
a correlative interface between the kinematic controller and the at least one heater, wherein the correlative interface monitors upcoming ones of the motion control so as to anticipatorily actuate the at least one heater according to the upcoming ones of the motion control, wherein the correlative interface further comprises a feedback loop, wherein the feedback loop comprises at least one sensor associated with the print nozzle, wherein the sensor comprises an encoder configured to provide positional information of a motor capable of moving the print nozzle in the at least two axes to track actuation of the motor, and wherein the correlative interface anticipatorily actuates the at least one heater based on the positional information of the motor.

2. The system of claim 1, further comprising an extruder that feeds the print material to the print nozzle pursuant to control by the kinematic controller.

3. The system of claim 2, wherein a feed rate of the extruder comprises a motion control.

4. The system of claim 3, wherein the feed rate comprises an acceleration or deceleration of the feed rate.

5. The system of claim 4, wherein an acceleration corresponds to an increase in heat from the at least one heater.

6. The system of claim 1, wherein the correlative interface comprises a thermal profile based on the heater and the print nozzle.

7. The system of claim 6, wherein the thermal profile comprises a hysteresis.

8. The system of claim 6, wherein the anticipatory actuation comprises a time to heat the at least one heater and a degree at which to heat the at least one heater at least partially indicated by the thermal profile.

9. The system of claim 1, wherein the anticipatory actuation is a function of adverse conditions of the motion control.

10. The system of claim 9, wherein the adverse condition comprise a lag in the print filament delivery.

11. The system of claim 9, wherein the adverse condition comprise a drag on the print filament delivery.

12. The system of claim 1, wherein the correlative interface comprises kinematics hardware.

13. The system of claim 12, wherein the kinematics hardware comprises a gantry.

14. The system of claim 1, wherein the motion control is in at least three axes.

15. The system of claim 1, wherein the correlative interface comprises a coordinated motion interface.

16. The system of claim 1, wherein the correlative interface further comprises a dedicated heater controller for the at least one heater.

17. The system of claim 1, wherein the at least one heater and the print nozzle comprise a low thermal mass.

18. The system of claim 1 further comprising a second motor, wherein the motor and the second motor each drive the print nozzle in a first axis and second axis, respectively.

19. The system of claim 18, where the motor and the second motor are coordinated.

20. The system of claim 1, wherein the correlative interface is configured to anticipatorily increase or decrease a temperature of the at least one heater based on the positional information of the motor.

* * * * *